United States Patent
Lu

(10) Patent No.: US 11,163,331 B2
(45) Date of Patent: Nov. 2, 2021

(54) KEYBOARD MODE

(71) Applicant: Hewlett-Packard Development Company, L.P., Spring, TX (US)

(72) Inventor: Laurent Lu, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/977,513

(22) PCT Filed: Apr. 27, 2018

(86) PCT No.: PCT/US2018/029889
§ 371 (c)(1),
(2) Date: Sep. 2, 2020

(87) PCT Pub. No.: WO2019/209329
PCT Pub. Date: Oct. 31, 2019

(65) Prior Publication Data
US 2021/0041913 A1 Feb. 11, 2021

(51) Int. Cl.
*G06F 1/16* (2006.01)
*H04L 12/24* (2006.01)

(52) U.S. Cl.
CPC .......... *G06F 1/1618* (2013.01); *G06F 1/1643* (2013.01); *G06F 1/1662* (2013.01); *G06F 1/1677* (2013.01); *G06F 1/1681* (2013.01); *H04L 41/00* (2013.01)

(58) Field of Classification Search
None
See application file for complete search history.

(56) References Cited

U.S. PATENT DOCUMENTS

| | | | |
|---|---|---|---|
| 7,884,807 B2 | 2/2011 | Hovden et al. | |
| 8,412,269 B1 | 4/2013 | Cook | |
| 9,053,250 B2 | 6/2015 | Halim et al. | |
| 9,201,510 B2 | 12/2015 | Griffin et al. | |
| 9,502,002 B2 | 11/2016 | Ripp et al. | |
| 9,600,167 B2 | 3/2017 | Hauser et al. | |
| 9,606,664 B2 | 3/2017 | Knepper et al. | |
| 2003/0112588 A1 | 6/2003 | Shimano | |
| 2006/0164381 A1 | 7/2006 | Suk et al. | |
| 2011/0080290 A1* | 4/2011 | Baxi | A61B 5/1116 340/573.1 |
| 2013/0141854 A1 | 6/2013 | Behar et al. | |
| 2013/0162515 A1 | 6/2013 | Prociw et al. | |

(Continued)

*Primary Examiner* — James A Edwards
(74) *Attorney, Agent, or Firm* — Conley Rose P.C.

(57) ABSTRACT

In some examples, a portable computer includes a housing with a first housing member and a second housing member rotatably coupled, a processor disposed in the housing, a physical keyboard disposed in the first housing member, a display screen disposed in the second housing member, a proximity sensor disposed in the second housing member, and a video port to communicate with an external display screen. The portable computer is to operate in a keyboard mode in response to the second housing member being within a threshold distance from an object external to the portable computer based on a signal from the proximity sensor. During the keyboard mode, the display screen of the portable computer is to be inactive, the physical keyboard is to be active, and the processor is to send video data to the external display screen via the video port.

13 Claims, 2 Drawing Sheets

(56) References Cited

U.S. PATENT DOCUMENTS

2015/0185788 A1    7/2015  Matsuoka
2018/0114010 A1*   4/2018  Van Os ................ G06F 3/0488
2019/0086955 A1*   3/2019  Li .......................... G06F 1/169

* cited by examiner

KEYBOARD MODE

BACKGROUND

Various laptop or notebook computers may be equipped with a touch-sensitive display screen. These types of portable computers may include hinged housing members supporting a physical keyboard and an incorporated display screen.

BRIEF DESCRIPTION OF THE DRAWINGS

Various examples are described below referring to the following figures.

DETAILED DESCRIPTION

Figure 1:
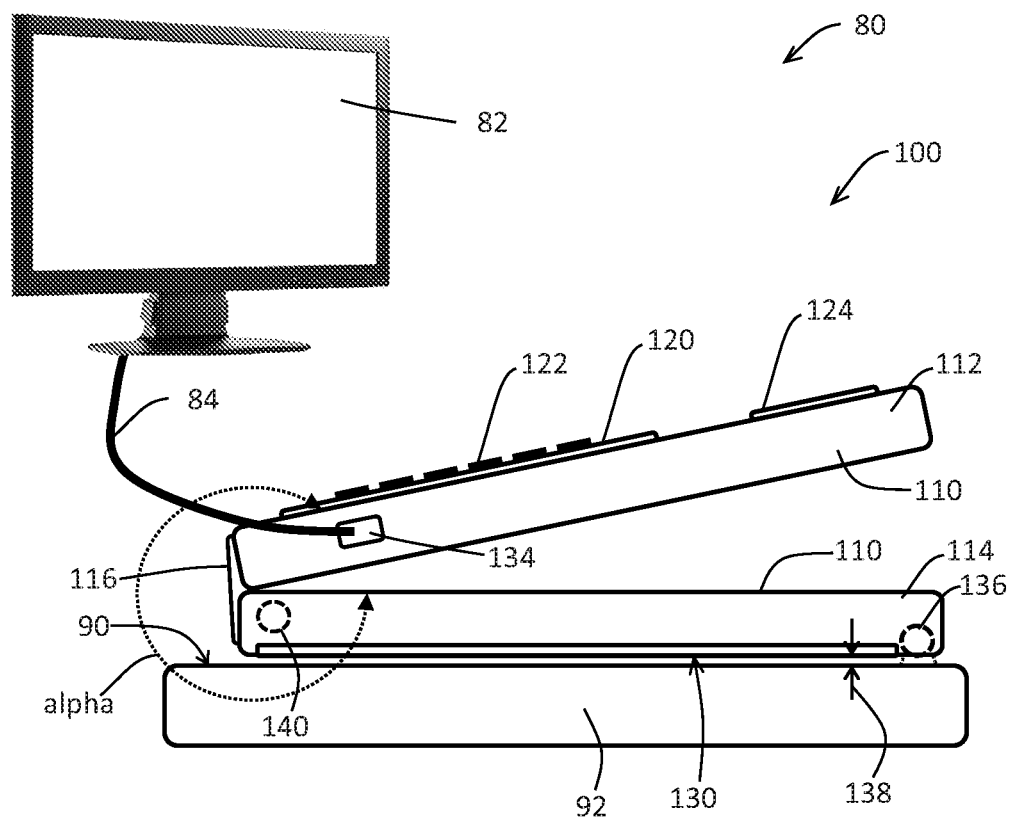
FIG. 1 shows a computer system that includes a portable computer capable of operating in a keyboard mode in accordance with various examples.

In the figures, certain features and components disclosed herein may be shown exaggerated in scale or in somewhat schematic form, and some details of elements may not be shown in the interest of clarity and conciseness. In some of the figures, in order to improve clarity and conciseness, a component or an aspect of a component may be omitted.

In the following discussion and in the claims, the terms "including" and "comprising" are used in an open-ended fashion, and thus should be interpreted to mean "including, but not limited to . . . ." Also, the term "couple" or "couples" is intended to be broad enough to encompass both indirect and direct connections. Thus, if a first device couples to a second device, that connection may be through a direct connection or through an indirect connection via other devices, components, and connections. As used herein, including in the claims, the word "or" is used in an inclusive manner. For example, "A or B" means any of the following: "A" alone, "B" alone, or both "A" and "B."

Various laptop or notebook computers equipped with a touch-sensitive display screen may be selectively used in a laptop mode or in a tablet mode. These types of portable computers include hinged housing members supporting a physical keyboard and an incorporated display screen. In the laptop mode, both the screen and keyboard are accessible to a user and are active. In the tablet mode, the hinged housing members are opened widely so the display screen and keyboard do not face one another and may be positioned back-to-back. The screen is active but the keyboard is deactivated to avoid unwanted, inadvertent input. These two modes of operation do not provide all the versatility that may be desirable for some portable computers. For example, in some situations it may be convenient to use the portable computer, including its keyboard, while connected to an external monitor while the incorporated display screen is tucked away to keep it out of the field of view of the external monitor and to accommodate limited desk space. A portable computer having a third mode of operation, a keyboard mode as disclosed herein, offers this and possibly other benefits to an end user.

In various examples in accordance with the present disclosure, a portable computer, such as a laptop or notebook computer, is equipped with display screen. The computer may be selectively used in a laptop mode, in a tablet mode, or a keyboard mode of operation. The display screen may be touch-sensitive. The portable computer includes a first housing member that supports a physical keyboard. The first housing member is hinged to a second housing member that supports the incorporated display screen. In the laptop mode, the display screen and keyboard are rotatably opened by an angle of less than 180° (degrees), generally closer to 115°. Both the screen and keyboard are active. In various examples, in the tablet mode, the display screen and keyboard are rotatably opened by an angle of 180° to 360°. The screen is active but the keyboard is deactivated to avoid unwanted, inadvertent input. Depending on the type of hinge utilized in a portable computer that is configured in accordance with the present disclosure, angular measurements between the first and second housing members may be approximate or precise. In general, a zero degree angle between the housing members means that the housing members are parallel and the display screen and keyboard are facing one another. In general, a 360° angle between the housing members means that the housing members are parallel and the display screen and keyboard are facing opposite directions.

To prepare the portable computer for the keyboard mode, the display screen and keyboard may be positioned at an angle greater than 180° and less than or equal to 360°. During the keyboard mode, the screen or the housing for the screen is to be located adjacent or is to sit on an object, within a threshold distance. The object may be, as examples, a physical desktop, a user's lap, or another surface. The computer may be arranged with the keyboard facing toward a user and with the screen facing away from the user.

The computer includes a timing circuit and a proximity sensor or related sensor to detect and determine when the screen remains on the surface in order to activate the keyboard mode. During the keyboard mode, the incorporated display screen is deactivated while the keyboard remains active. To facilitate use of the keyboard mode, a video port of the computer is activated and may be connected to communicate with an external display screen. The video port may be to connect to an external wire or cable or may be a wireless port for wireless communication. While using the computer in the keyboard mode, a user is able to type on the computer's keyboard and use the computing power of the computer's processor while viewing the results on the external display screen.

FIG. 1 shows an example in accordance with the present disclosure. In FIG. 1, a computer system 80 includes a portable computer 100 coupled to an external display screen 82 by a communication coupling 84. Coupling 84 is represented by a cable that may be, as examples, a cable for High-Definition Multimedia Interface (HDMI), video graphics adapter (VGA), Display Port, Digital Visual Interface (DVI), or another analog or digital video communication protocol, which provides audio communication in some examples. In some examples, communication coupling 84 includes a wireless communication capability instead of or in addition to a wired communication capability. In FIG. 1, portable computer 100 is sitting on a horizontal surface 90 of a physical desktop 92 and is to be in a keyboard mode when computer 100 and a processor 150 (described below) are "on."

Figure 2:
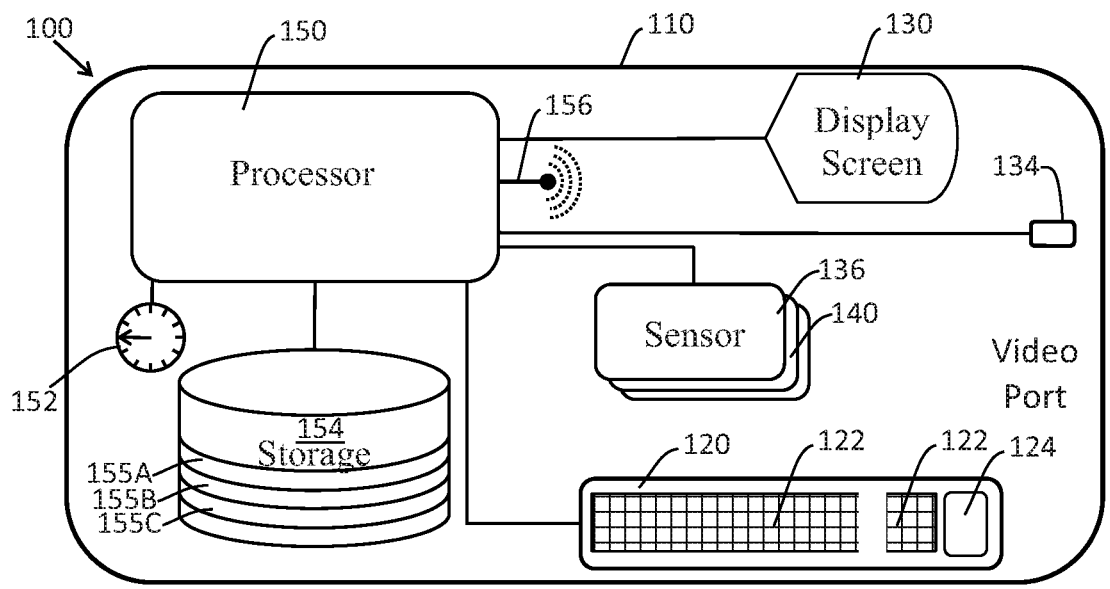
FIG. 2 shows a schematic diagram of the computer of FIG. 1 in accordance with various examples.

Referring now to FIGS. 1 and 2, portable computer 100 includes a housing 110 that includes a first housing member 112, a second housing member 114, and a rotatable coupling or hinge 116 that links members 112, 114. Computer 100 also includes a physical keyboard 120, a touch tablet 124, touch-sensitive display screen 130, a video port 134, a first sensor 136, a second sensor 140, a processor 150, a timer 152, storage 154, and a wireless communication device 156 all coupled to and located or, equivalently, disposed in housing 110. In this example, physical keyboard 120 and touch tablet 124 are disposed in first housing member 112, and display screen 130 is disposed in second housing member 114. Keyboard 120 includes a plurality of physical keys 122. In some examples, keyboard 120 includes more than 30 physical keys 122. Video port 134 is to communicate via communication coupling 84 with display screen 82 located external to the portable computer 100.

Sensor 136 includes a proximity sensor disposed in the second housing member 114. Sensor 136 may be selected from among a group of sensors that includes an optical sensor and a time-of-flight (TOF) sensor, as examples. While computer 100 is operating, sensor 136 is to generate a "first sensor signal" when the second housing member 114 is within a selected or predetermined threshold distance from an object external to the portable computer. If member 114 were to move away from the object by a distance greater than the threshold distance, the sensor 136 would cease to generate the first sensor signal and may generate a different signal or no signal. The distance 138 between the external surfaces of desktop surface 90 and computer 100 in FIG. 1 is an example of the threshold distance. In other examples, computer 100 may operate in a keyboard mode when disposed within the threshold distance from another external object, such as a user's lap for example. The surface of the desktop 92 or other external object may be oriented in any direction, such as horizontally or diagonally.

Sensor 140 is disposed in housing 110 proximal hinge 116 and is to evaluate the angular position of housing member 112 relative to member 114, which may be measured or described with reference to an angle alpha. In some examples, sensor 140 includes a proximity sensor. In some examples, sensor 140 is a magnetic flux sensor. While computer 100 is operating, the sensor 140 is to generate a "second sensor signal" when the first housing member 112 is oriented with respect to the second housing member 114 such that angle alpha is equal to or greater than 180° (degrees) and less than or equal to 360° from a closed position. If angle alpha were changed to be outside this range, the sensor 140 would cease to generate the second sensor signal and may generate a different signal or no signal. In regard to the sensor signals, the terms "first" and "second" are used as identifiers herein, including in the claims, and are not intended to indicate a time sequence. For example, the second signal of sensor 140 may occur before, during, after, or in solitude with respect to the first sensor signal of sensor 136 and vice versa. A response from a sensor may include an analog signal or a digital signal. When alpha is greater than 180°, display screen 130 and keyboard 120 face away from one another. In FIG. 1, alpha is greater than 270° and less than 360° from a closed position, and display screen 130 and keyboard 120 face away from one another. In some examples, sensor 140 is to generate the second sensor signal in response to the first housing member 112 being oriented with respect to the second housing member 114 at an angle alpha that is greater than or equal to 350° from the closed position.

FIG. 2 shows interconnections between processor 150 and other components of computer 100. In this example, processor 150 is a central processing unit, which directs the operations of the computer, performing calculations and making decisions while governing other components. Storage 154 is a computer-readable medium holding computer-executable code to be executed by processor 150. In various examples, computer executable code may also be called machine executable code. The computer executable code stored in storage 154 includes code 155A to implement the laptop mode, code 155B to implement the tablet mode, and code 155C to implement the keyboard mode, as well as code to cause the processor 150 to perform some or all of the other actions described herein. Implementation of some of these modes of operation will be discussed below. During operation, processor 150 executes code from storage 154. For example, as a result of executing the code, the processor 150 may receive signals or data from sensors 136, 140 and may perform an action based on those signals or data, such as implementing a mode of operation appropriate to the information available from sensors 136, 140. In some examples, timer 152 or storage 154 may be incorporated into processor 150, or processor 150 includes a video processing capabilities.

As disclosed above, the modes of operation of computer 100 include a laptop mode, a tablet mode, and a keyboard mode. Computer 100 may also implement a fourth mode of operation. When housing members 112, 114 are rotated so that angle alpha is zero degrees, such that keyboard 120 and display screen 130 directly face one another and may touch one another, computer 100 is "closed." When computer 100 is closed, computer 100 may implement a fourth mode of operation in which computer 100 or its processor 150 is "asleep," "hibernating" or "off." Even so, in some examples of operation, computer 100 is active or "on" when alpha equals zero.

During the tablet mode, the internal display screen 130 is to be active, and the physical keyboard 120 is to be inactive. Activation of the tablet mode may be based on processor 150 receiving the second sensor signal from sensor 140. Computer 100 is to operate in the tablet mode in response to the first housing member 112 being oriented with respect to the second housing member 114 at an angle alpha that is greater than or equal to 180° and less than or equal to 360° from the closed position. In some examples, the tablet mode is implemented when angle alpha that is greater than or equal to 270° and less than or equal to 360° from the closed position. If the second sensor signal stops being generated, computer 100 may cease to be in the tablet mode.

During the keyboard mode, the internal display screen 130 is to be inactive, the physical keyboard 120 is to be active, and processor 150 is to send video data to the external display screen 82 via the video port 134. Sending data to video port 134 may involve a graphics card that is separate or distinct from processor 150. Processor 150 is to perform as a central processing unit during the keyboard mode.

Portable computer 100 is to operate in the keyboard mode in response to the second housing member 114 being within a threshold distance, such as distance 138, from an object that is external to the portable computer based on a sensor signal from the proximity sensor. Based on the location of sensor 136, computer 100 may enter the keyboard mode in response to display screen 130 facing an external object. The keyboard mode may be activated in response to the second housing member 114 resting on an object external to the portable computer.

In some examples, computer 100 is to operate in the keyboard mode in response to the first housing member 112 being oriented with respect to the second housing 114 member at an angle alpha that is greater than 180° and less than or equal to 360° from the closed position. Thus, activation of the keyboard mode may be based on processor 150 receiving a first sensor signal from sensor 136 and a second sensor signal from sensor 140. If one or both of the first and second sensor signals stops, computer 100 may cease to be in the keyboard mode. In some examples, the order in which sensor 136, 140 generate their appropriate sensor signals or the order in which processor 150 receives these signals does not influence the entry into the keyboard mode or the cessation of the keyboard mode.

Comparing the tablet mode to the keyboard mode, the computer is to operate in a tablet mode when processor 150 receives the second sensor signal from sensor 140. However, if the second housing member is within a threshold distance from an object external to the portable computer, processor 150 is also to receive the first sensor signal from sensor 136 and is to activate the keyboard mode. Stated another way, computer 100 is to operate in a tablet mode based on the second sensor signal if the first sensor signal is not generated.

In some examples, timer 152 is to perform a delay function based on the first sensor signal from sensor 136. In some examples, timer 152 is to perform the delay function based on the second sensor signal. In some examples, the timer is to perform a delay function based on the second sensor signal and the first sensor signal. In these examples, portable computer 100 is to operate in the keyboard mode after the delay function is completed.

Figure 3:
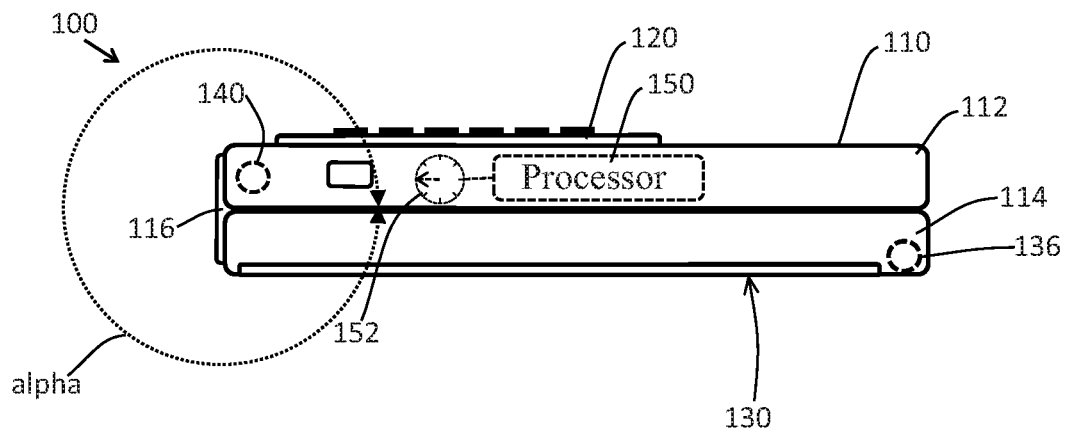
FIG. 3 shows another arrangement of the computer of FIG. 1 in accordance with various examples.

FIG. 3 shows an arrangement of portable computer 100 as it may be used during the keyboard mode. Computer 100 is fully opened with angle alpha being 360° so that display screen 130 and keyboard 120 face in opposite directions, and housing members 112, 114 are positioned back-to-back. Computer 100, as arranged in FIG. 3, would implement the keyboard mode when positioned so that sensor 136 is within a threshold distance from an object.

Sensor 136 of FIG. 1 is capable of detecting the proximity of an external object, and, more broadly, sensor 136 is an example of a sensor that is to generate a first sensor signal when housing 110 or housing member 114 has a specified orientation with respect to a surrounding environment. The surrounding environment may, for example, include the external object that is detectable by sensor 136. In some examples, surrounding environment includes a geometric plane, and a sensor 136 includes an orientation sensor to determine the orientation of housing 110 or housing member 114 with respect to the geometric plane rather than by proximity to an object. This type of sensor may, for example, generate a first sensor signal corresponding to the keyboard mode when housing member 144 is inverted with respect to the geometric plane. The geometric plane may be associated with the earth, for example.

The above discussion is meant to be illustrative of the principles and various examples of the present disclosure. Numerous variations and modifications will become apparent to those skilled in the art. It is intended that the following claims be interpreted to embrace all such variations and modifications.

What is claimed is:

1. A portable computer comprising:
   a housing including a first housing member and a second housing member rotatably coupled together;
   a processor disposed in the housing;
   a physical keyboard disposed in the first housing member;
   a display screen disposed in the second housing member;
   a proximity sensor disposed in the second housing member;
   a video port to communicate with an external display screen located external to the portable computer; and
   a timer,
   wherein the portable computer is to operate in a keyboard mode in response to the second housing member being within a threshold distance from an object external to the portable computer based on a sensor signal from the proximity sensor,
   wherein, during the keyboard mode, the display screen of the portable computer is to be inactive, the physical keyboard is to be active, and the processor is to send video data to the external display screen via the video port,
   wherein the timer is to perform a delay function based on the sensor signal, and
   wherein the portable computer is to operate in the keyboard mode after the delay function is completed.

2. The portable computer of claim 1 wherein the portable computer is to operate in the keyboard mode in response to the first housing member being oriented with respect to the second housing member at an angle that is greater than 180 degrees and less than or equal to 360 degrees from a closed position.

3. The portable computer of claim 1,
   wherein the portable computer is to operate in a tablet mode in response to the first housing member being oriented with respect to the second housing member at an angle that is greater than or equal to 270 degrees and less than or equal to 360 degrees from a closed position unless the second housing member is within a threshold distance from the object external to the portable computer, whereupon, the portable computer is to operate in the keyboard mode, and
   wherein during the tablet mode the display screen of the portable computer is to be active, and the physical keyboard is to be inactive.

4. The portable computer of claim 1 comprising a timer,
   wherein the timer is to perform a delay function based on the sensor signal, and
   wherein the portable computer is to operate in the keyboard mode after the delay function is completed.

5. The portable computer of claim 1 wherein the portable computer is to enter the keyboard mode in response to the display screen of the portable computer facing the object external to the portable computer.

6. The portable computer of claim 5 wherein the portable computer is to enter the keyboard mode in response to the second housing member resting on the object external to the portable computer.

7. A portable computer comprising:
   a housing including a first housing member and a second housing member rotatably coupled together,
   a processor disposed in the housing,
   a physical keyboard disposed in the first housing member,
   a display screen disposed in the second housing member,
   a first sensor disposed in the housing,
   a timer, and
   wherein the first sensor is to generate a first sensor signal when the housing has a specified orientation with respect to a surrounding environment,
   wherein the portable computer is to operate in a keyboard mode based on the first sensor signal, and
   wherein, during the keyboard mode, the display screen of the portable computer is to be inactive, the physical keyboard is to be active, and the processor is to send video data to a display screen external to the portable computer,
   wherein the first sensor is a proximity sensor disposed in the second housing member, wherein the first sensor is to generate the first sensor signal when the second housing member is within a threshold distance from an object external to the portable computer, and wherein the timer is to perform a delay function based on a second sensor signal and the first sensor signal, and wherein the portable computer is to operate in the keyboard mode after the delay function is completed.

8. The portable computer of claim 7 comprising a second sensor disposed in the housing, wherein the second sensor is to generate the second sensor signal when the first housing member is oriented with respect to the second housing member at an angle that is greater than 180 degrees and less than or equal to 360 degrees from a closed position, and wherein the portable computer is to operate in a keyboard mode based on the second sensor signal and the first sensor signal.

9. The portable computer of claim 8 wherein the display screen is touch-sensitive, wherein the second sensor is to generate the second sensor signal if the angle is greater than or equal to 350 degrees from the closed position, wherein the portable computer is to operate in a tablet mode based on the second sensor signal if the first sensor signal is not generated, and wherein, during the tablet mode, the display screen of the portable computer is to be active and the physical keyboard is to be inactive.

10. The portable computer of claim 7 wherein the processor is to perform as a central processing unit during the keyboard mode.

11. A portable computer comprising:

a housing including a first housing member and a second housing member;

a hinge coupled between the first housing member and the second housing member;

a processor disposed in the housing;

a physical keyboard disposed in the first housing member;

a display screen disposed in the second housing member;

a proximity sensor disposed in the second housing member;

a timer; and a video port to communicate with an external display screen located external to the portable computer, wherein the proximity sensor is to generate a sensor signal when the second housing member is within a threshold distance from an object external to the portable computer, wherein the timer is to perform a delay function based on the sensor signal, wherein the portable computer is to operate in a keyboard mode in response to the delay function being completed, and wherein, during the keyboard mode, the display screen of the portable computer is to be inactive, the physical keyboard is to be active, and the processor is to send video data to the external display screen via the video port.

12. The portable computer of claim 11 comprising a second sensor disposed in the housing, wherein the second sensor is to generate a second sensor signal when the first housing member is oriented with respect to the second housing member at an angle that is greater than 180 degrees and less than or equal to 360 degrees from a closed position, and wherein the timer is to perform the delay function based on the second sensor signal.

13. The portable computer of claim 11 wherein the processor is to perform as a central processing unit during the keyboard mode.

* * * * *